United States Patent
Kubota et al.

(10) Patent No.: US 10,486,470 B2
(45) Date of Patent: Nov. 26, 2019

(54) PNEUMATIC TIRE

(71) Applicant: The Yokohama Rubber Co., LTD., Minato-ku, Tokyo (JP)

(72) Inventors: Masataka Kubota, Hiratsuka (JP); Yuji Minami, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 599 days.

(21) Appl. No.: 14/769,738

(22) PCT Filed: Feb. 21, 2014

(86) PCT No.: PCT/JP2014/054235
§ 371 (c)(1),
(2) Date: Aug. 21, 2015

(87) PCT Pub. No.: WO2014/129601
PCT Pub. Date: Aug. 28, 2014

(65) Prior Publication Data
US 2016/0009137 A1    Jan. 14, 2016

(30) Foreign Application Priority Data

Feb. 22, 2013  (JP) ................................ 2013-033487

(51) Int. Cl.
*B60C 3/04* (2006.01)
*B60C 11/03* (2006.01)
(52) U.S. Cl.
CPC ............... *B60C 3/04* (2013.01); *B60C 11/03* (2013.01); *B60C 11/033* (2013.01);
(Continued)

(58) Field of Classification Search
CPC ......... B60C 3/04; B60C 11/033; B60C 11/04; B60C 2011/0383; B60C 2011/0381
See application file for complete search history.

(56) References Cited

U.S. PATENT DOCUMENTS 6,439,284 B1 * 8/2002 Fontaine ............. B60C 11/0302
                                                 152/209.15
D665,730 S * 8/2012 Yoshimura .................. D12/584
(Continued)

FOREIGN PATENT DOCUMENTS

CN    102632772       8/2012
EP    588781 A1 *   3/1994
(Continued)

OTHER PUBLICATIONS

Machine translation for Japan 2012-162194 (Year: 2017).*
(Continued)

*Primary Examiner* — Steven D Maki
(74) *Attorney, Agent, or Firm* — Thorpe North & Western (57) ABSTRACT

The present technology relates to a pneumatic tire in which the ratio of the total width SW and the outer diameter OD satisfies SW/OD≤0.3, and grooves are provided on the tread portion. In the ground contact region of the tread portion, when the groove area ratio with respect to the ground contact area is GR, the ground contact width is W, the region having a width of 50% of the ground contact width W and the tire equatorial line as center is the center region, the groove area ratio in the center region is GCR, the ground contact region on the outer side in the tire width direction of the center region is the shoulder region, and the groove area ratio in the shoulder region is GSR, the ground contact region of the tread portion is formed to satisfy 10%≤GR≤25% and GCR≤GSR.

11 Claims, 4 Drawing Sheets

(52) U.S. Cl.
CPC ...... B60C 11/0306 (2013.01); B60C 11/0332 (2013.01); *B60C 2011/039* (2013.01); *B60C 2011/0341* (2013.01); *B60C 2011/0348* (2013.01); *B60C 2011/0381* (2013.01); *B60C 2011/0383* (2013.01); *Y02T 10/862* (2013.01)

(56) References Cited

U.S. PATENT DOCUMENTS

| 2013/0042953 | A1 | 2/2013 | Kuwayama |
| 2013/0167996 | A1* | 7/2013 | Oda ................ B60C 11/04 152/209.18 |
| 2013/0220501 | A1 | 8/2013 | Hatanaka et al. |
| 2014/0158263 | A1* | 6/2014 | Hatanaka ............ B60C 3/04 152/209.18 |

FOREIGN PATENT DOCUMENTS

| JP | H06-183214 | 7/1994 |
| JP | H06-191228 | 7/1994 |
| JP | H07-172110 | 7/1995 |
| JP | 2012-091736 | 5/2012 |
| JP | 2012-162194 | 8/2012 |
| JP | 2012-162194 A * | 8/2012 |
| JP | 2013-028289 | 2/2013 |
| WO | WO 2011/135774 | 11/2011 |
| WO | WO 2012/066725 | 5/2012 |
| WO | WO-2013/014950 A1 * | 1/2013 |

OTHER PUBLICATIONS

Machine translation for Europe 588,781 (Year: 2017).*
International Search Report for International Application No. PCT/JP2014/054235 dated Mar. 25, 2014, 4 pages, Japan.
Oponeo, Tire Size—How to Find the Right One?, online, https://www.oponeo.de/reifen-abc/reifengrose, retrieved on Jun. 6, 2019, 36 pages, Germany.

* cited by examiner

PNEUMATIC TIRE

TECHNICAL FIELD

The present technology relates to a pneumatic tire with improved fuel economy.

BACKGROUND

Conventionally, pneumatic tires that reduce rolling resistance have been proposed in order to contribute to the fuel economy of vehicles such as hybrid vehicles (HV) and electric vehicles (EV) in particular. In recent years, there is an even higher demand for pneumatic tires to make a higher contribution to the fuel economy of vehicles, as concerns for the environment increase.

Reducing the total width (SW) of a pneumatic tire so that the front projected area (the projected area viewed from the rolling direction of the pneumatic tire) is decreased to reduce the air resistance around the tire is known as a method of reducing the rolling resistance of pneumatic tires (for example, see International Patent Publication No. WO/2011/135774).

However, with the method as described above, the ground contact width is reduced as the total width of the pneumatic tire is reduced, so it is necessary to increase the outer diameter (OD) in order to maintain a certain load capacity. Therefore, the ground contact length of the pneumatic tire becomes comparatively longer.

When the ground contact length of a pneumatic tire increases, there is a possibility of an increase in air column resonance caused by natural vibrations of air within the circumferential grooves excited by vibrations and the like of the tread portion of the pneumatic tire, and, as a result, that the external noise will increase.

SUMMARY

The present technology provides a pneumatic tire capable of reducing external noise, while reducing rolling resistance.

The present technology provides
 a pneumatic tire including grooves on a tread portion,
 the ratio of a total width SW and an outer diameter OD of the pneumatic tire SW/OD satisfying:

$SW/OD \leq 0.3$ and
 in a ground contact region of the tread portion, when a groove area ratio with respect to a ground contact area is GR, a ground contact width is W, a region having a width of 50% of the ground contact width W and a tire equatorial line as center is a center region AC, a groove area ratio in the center region AC is GCR, a ground contact region on an outer side in a tire width direction from the center region AC is a shoulder region AS, and a groove area ratio in the shoulder region AS is GSR, the ground contact region of the tread portion being formed to satisfy:

$10\% \leq GR \leq 25\%$ $GCR \leq GSR$.

According to the pneumatic tire of the present in technology, external noise can be reduced, while reducing rolling resistance.

DETAILED DESCRIPTION OF THE TECHNOLOGY

Figure 1:
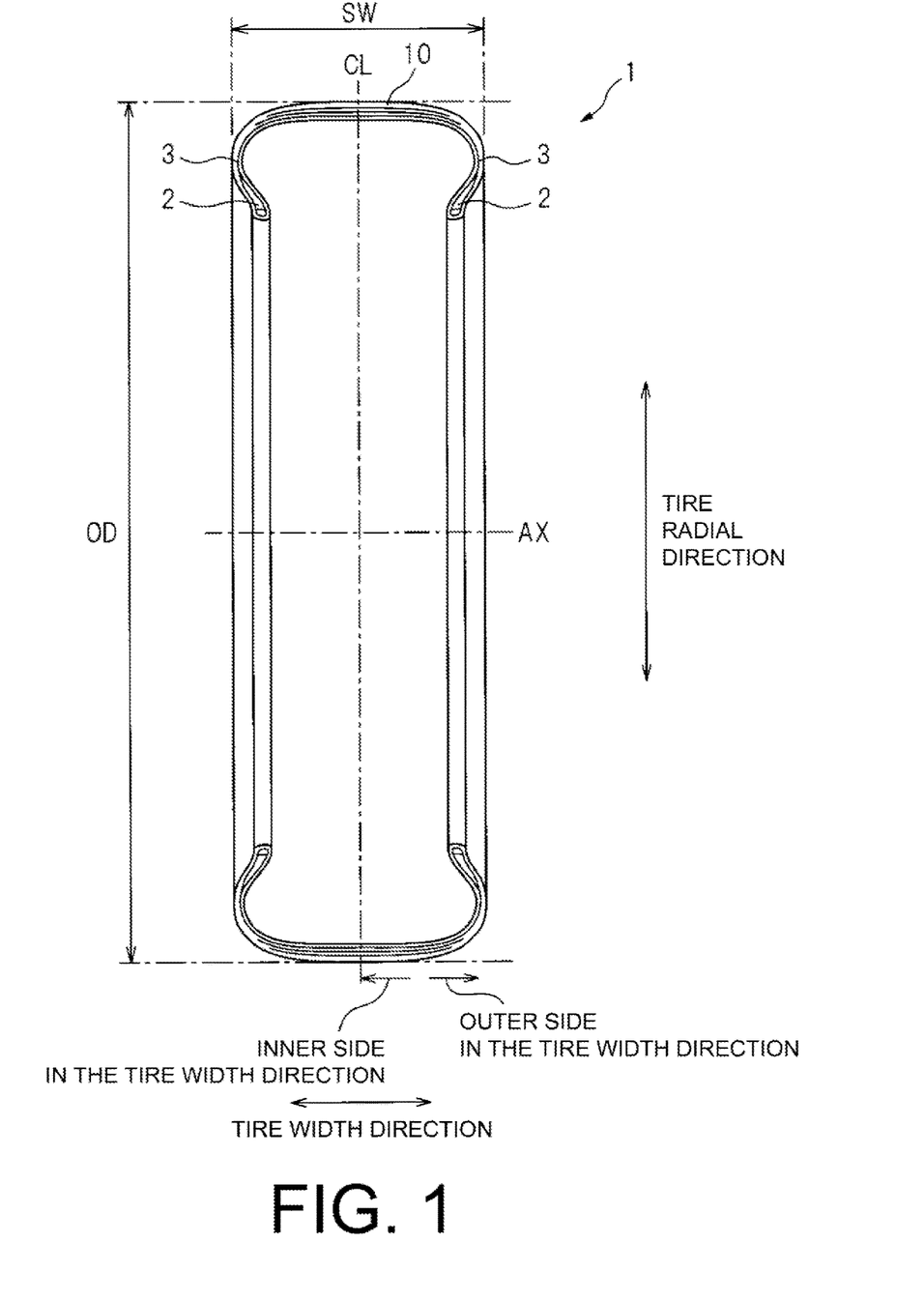
FIG. 1 is a meridian cross-sectional view of a pneumatic tire according to an embodiment of the present technology.

The following is a description of a pneumatic tire 1 according to an embodiment of the present technology, with reference to the drawings. FIG. 1 is a meridian cross-sectional view of the pneumatic tire 1 according to the embodiment of the present technology. Note that the pneumatic tire 1 according to the present embodiment has a meridian cross-section form the same as a conventional pneumatic tire. Here, the meridian cross-section form of the pneumatic tire refers to the cross-sectional shape of the pneumatic tire as it appears on a plane normal to the tire equatorial plane CL.

In the following description, "tire radial direction" refers to a direction perpendicular to the rotational axis AX of the pneumatic tire 1. Also, "tire circumferential direction" refers to the direction of rotation about the rotational axis AX as center (see FIG. 2). Additionally, "tire width direction" refers to the direction parallel to the rotational axis AX; "inner side in the tire width direction" refers to the side toward the tire equatorial plane (tire equator line) CL in the tire width direction; and "outer side in the tire width direction" refers to the side distanced from the tire equatorial plane CL in the tire width direction. "Tire equatorial plane CL" refers to a plane that is perpendicular to the rotational axis AX of the pneumatic tire 1 and that passes through the center of the tire width of the pneumatic tire 1. "Tire equator line" refers to a line along the tire circumferential direction of the pneumatic tire 1 that lies on the tire equatorial plane CL. In this specification and the drawings, "tire equator line" is given the same reference symbol "CL" as that given to the tire equatorial plane.

In the tire meridian cross-section view, the pneumatic tire 1 according to the present embodiment includes a pair of bead portions 2, sidewall portions 3 connected to the bead portions, and a tread portion 10 connected to the sidewall portions.

Note that there is no particular limitation on the inner structure of the pneumatic tire in the present technology. The inner structure of the pneumatic tire varies depending on the performance or design required for the pneumatic tire, and is preferably determined in order to satisfy various requirements through tests or simulation, for example.

The pneumatic tire 1 according to the present embodiment is formed so that the ratio of the total width SW and the outer diameter OD satisfies the relationship:

$SW/OD \leq 0.3$ <1>.

Note that in the present technology, the total width SW is the distance between the two sidewalls including any design on the sidewalls, when the pneumatic tire 1 is assembled onto a rim, and filled with an internal pressure of 230 kPa (or any set internal pressure) in order to specify the dimensions of the pneumatic tire 1, in the unloaded state. Also the outer diameter OD is the outer diameter of the tire at this time. Note that the internal pressure of 230 kPa is selected in order to specify the dimensions of the pneumatic tire as stated above. Therefore, it should be noted that provided the pneumatic tire 1 according to the present technology is filled with an internal pressure within the range normally used, the effect of the present technology is exhibited, and filling with an internal pressure of 230 kPa is not essential in terms of implementing the present technology.

Here, the rim used in the present technology has a diameter compatible with the inner diameter of the pneumatic tire 1, and has a nominal rim width corresponding to the specified rim width Rm (mm) given in Table 2 that is closest to the value (Rm=K1×Sn) obtained from the product of the nominal tire cross-sectional width Sn and the coefficient K1 from Table 1 corresponding to the aspect ratio of the tire assembled onto the rim, in accordance with ISO 4000-1:2001.

TABLE 1

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Figure 2:
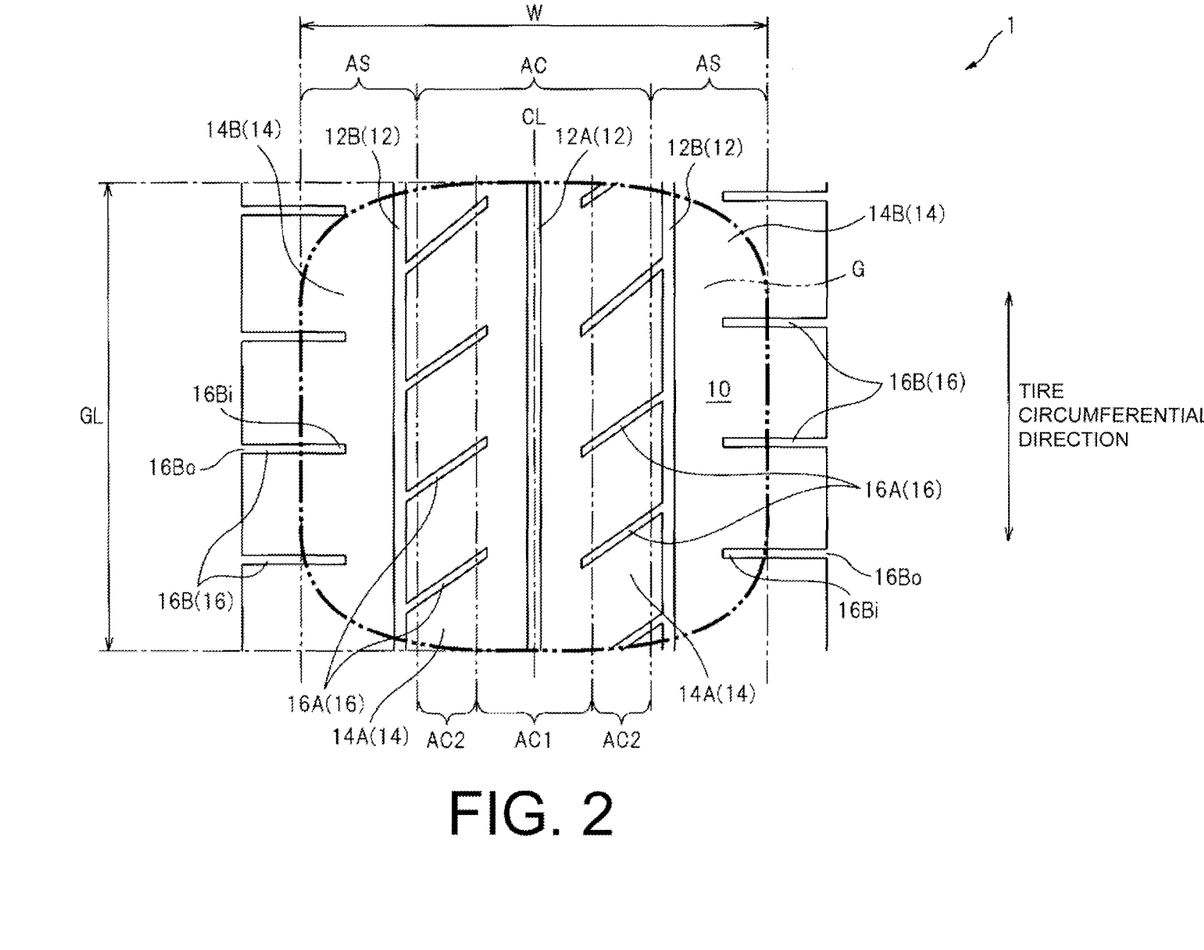
FIG. 2 is a plan development view illustrating a portion of the tread portion of the pneumatic tire according to an embodiment of the present technology.

FIG. 2 is a plan development view illustrating a portion of the tread portion 10 of the pneumatic tire 1 according to an embodiment of the present technology. Three circumferential grooves 12A, 12B extending in the tire circumferential direction, and land portions 14A, 14B partitioned by the circumferential grooves 12A, 12B are formed on the tread portion 10 of the pneumatic tire 1 according to the present embodiment. A plurality of lateral grooves 16A, 16B extending in a direction that traverses the tire circumferential direction is formed in the land portions 14A, 14B, respectively. Note that in this specification, grooves 12, 16 refer generically to the circumferential grooves 12 and the lateral grooves 16.

In the pneumatic tire 1 according to the present embodiment, in the ground contact region G of the tread portion 10 when contacting the flat ground surface with a load applied corresponding to 80% of the load capacity, the groove area ratio GR in the ground contact area, the groove area ratio GCR in the center region AC, and the groove area ratio GSR in the shoulder region AS are formed so as to satisfy the following relationships:

$10\% \le GR \le 25\%$ <2>

$GCR \le GSR$ <3>

In the present technology, the ground contact region G is the region of ground contact patch when the pneumatic tire 1 is assembled onto the rim as described above, inflated with an internal pressure of 230 kPa, and contacts a flat ground surface with a load corresponding to 80% of the load capacity applied. The ground contact width W is the maximum width in the tire width direction within the ground contact region. The ground contact length GL is the maximum length in the tire circumferential direction within the ground contact region. Also, in the present technology, the load capacity is defined based on ISO 4000-1: 1994. For a size for which the load capacity index is not set in that ISO standard, the load capacity can be determined by a separate calculation taking into consideration conformity with the standards of each country, and in this case, the load capacity is calculated based on the standards of each country. Therefore, in the present technology, the load capacity for each tire size is calculated from the following calculation equation (c), which is published in "Calculation of Load Capacity" in the commentary to JIS D 4202-1994, which is the actual load capacity calculation equation used in the JIS specification.

$X = K \times 2.735 \times 10 - 5 \times P^{0.585} \times Sd^{1.39} \times (D_R - 12.7 + Sd)$ where, X=load capacity (kg)
K=1.36
P=230 (=air pressure (kPa))
Sd=0.93×S1−0.637 d
S1=S×((180°−sin$^{-1}$(Rm/S))/131.4°)
S=design cross-sectional width (mm)
R$_m$=rim width corresponding to the design cross-sectional width (mm)
d=(0.9-aspect ratio [−])×S1−6.35
D$_R$=reference value for the rim diameter (mm)

Also, the groove area ratio GR is the ratio of the groove area to the sum of the land portion area and the groove area within the ground contact region G (=ground contact area).

In addition, as illustrated in FIG. 2, the center region AC is a region within the ground contact region G having a width of 50% of the ground contact width W with the tire equatorial line CL as center, and the shoulder region AS is a region within the ground contact region G located on the outer side in the tire width direction of the center region AC. Also, the groove area ratio GCR in the center region AC is the ratio of the groove area with respect to the sum of the land portion area and the groove area in the center region AC, and the groove area ratio GSR in the shoulder region AS is the ratio of the groove area with respect to the sum of the land portion area and the groove area in the shoulder region AS.

According to the pneumatic tire 1 of the embodiment as described above, the following actions and effects can be obtained.

(1) The pneumatic tire 1 according to the present embodiment is formed so that the ratio of the total width SW and the outer diameter OD satisfy the relationship in the above equation <1>. Accordingly, the total width SW relative to the outer diameter OD is smaller compared with a pneumatic tire of normal size (for example, 205/55R16 (SW/OD=0.32)). As a result, the front projected area of the pneumatic tire 1 is smaller, so the air resistance around the tire is reduced, and therefore the rolling resistance of the pneumatic tire 1 can be reduced. On the other hand, if the total width SW is simply made smaller, the load capacity of the pneumatic tire 1 will be reduced. However, by satisfying equation <1>, the outer diameter OD is increased relative to the total width SW, so the reduction in load capacity can be suppressed.

(2) The pneumatic tire 1 according to the present embodiment is formed so that the groove area ratio GR relative to the ground contact area takes a value in the range indicated by the above equation <2>. This range of groove area ratio GR is set lower compared with a normal pneumatic tire. In this way, the noise generated by the grooves 12, 16 provided mainly on the tread portion 10, in other words, the vehicle external noise, can be reduced. Note that in the pneumatic tire 1 according to the present embodiment, the total width SW is relatively narrower, and, as a result, the water drainage performance is improved. Therefore, in the pneumatic tire 1 according to the present embodiment, even though the groove area ratio GR is set low, provided it is within the range as stated above, the overall water drainage performance can be improved or maintained compared with a pneumatic tire of normal size.

(3) The pneumatic tire 1 according to the present embodiment is formed so that the groove area ratio GCR in the center region AC and the groove area ratio GSR in the shoulder region AS satisfy the relationship of the above equation <3>. As a result, the number of grooves provided in the center region AC close to the tire equatorial line CL is reduced compared with the shoulder region AS, so vehicle external noise, in particular, air column resonance, can be reduced.

(4) As described in (1), the pneumatic tire 1 according to the present embodiment has an outer diameter OD that is relatively larger and a total width SW that is relatively narrower compared with a pneumatic tire of normal size. Therefore, it is anticipated that vehicle reduced space occupation, improvement in design, and, in addition, improvement in water drainage performance resulting from the longer ground contact length can be achieved.

So far an example of a configuration of the present technology has been described by describing the tread pattern formed on the ground contact region G of the tread portion 10 of the pneumatic tire 1 according to the present embodiment in FIG. 2. However, it is sufficient provided at least one of the circumferential grooves 12 and the lateral grooves 16 is provided in the ground contact region G of the tread portion 10. The arrangement of the grooves 12, 16 on the tread portion 10, in other words, the configuration of the tread pattern, should be varied in accordance with the performance required of the pneumatic tire, the design, and the like. Therefore, in the present technology, after satisfying the relationship of the above equations <1> to <3>, preferably, the tread pattern is determined to satisfy the various requirements through, for example, testing, simulation, or the like.

Also, preferably, the relationship between the groove area ratio GCR in the center region AC and the groove area ratio GSR in the shoulder region AS satisfies:

$1.0 \leq GSR/GCR \leq 2.0$ <4> and, more preferably, satisfies:

$1.3 \leq GSR/GCR \leq 1.7$.

This is because if "GSR/GCR" is greater than 1.0, the grooves 12, 16 located in the center region AC are fewer compared with the shoulder region AS, so the vehicle external noise can be further reduced. Note that if "GSR/GCR" is greater than 2.0, the number of the grooves 12, 16 arranged in the shoulder region AS becomes too large, and it becomes difficult to maintain the steering stability.

Here, the region AC1 and the region AC2 are defined with reference to FIG. 2. The region AC1 is a region within the center region AC having a width corresponding to 25% of the ground contact width W with the tire equatorial plane CL as center. Also, the region AC2 is a region within the center region AC included on the outer side in the tire width direction of the region AC1. At this time, more preferably, the groove area ratio GCR1 in the region AC1 and the groove area ratio GCR2 in the region AC2 satisfy the relationship:

$GCR1 < GCR2$ <5>.

In other words, preferably, the ground contact region G of the tread portion 10 is formed so that within the center region AC, the groove area ratio is smaller in the region AC1 close to the tire equatorial line CL in particular. This is because the vehicle external noise can be further reduced.

Also, preferably, the groove area ratio GCR1 is 20% or less. In other words, preferably, the ground contact region G of the tread portion 10 is formed so that within the center region AC, the groove area, in particular, the circumferential groove area, is reduced in the region AC1 close to the tire equatorial line CL in particular. This is because the vehicle external noise can be further reduced.

Also, in the pneumatic tire 1 according to the present embodiment, one or more circumferential grooves 12 extending in the tire circumferential direction are provided on the tread portion. At this time, if the groove area ratio of the circumferential grooves 12A in the center region AC is A, preferably, the ratio with respect to the groove area ratio GCR in the center region AC satisfies:

$0 \leq A/GCR \leq 1.0$ <6>.

In other words, of the grooves 12, 16 formed in the ground contact region G of the tread portion 10, the effect on the air column resonance of the circumferential grooves 12 located in the center region AC close to the tire equatorial line CL is large. Therefore, preferably, the groove area ratio A of the circumferential grooves 12A located in the center region AC is reduced. If "A/GCR" is greater than 1.0, the proportion of circumferential grooves 12 relative to lateral grooves 16 increases, so the air column resonance increases, and it is difficult to effectively reduce the vehicle external noise.

In the ground contact region G of the tread portion 10 of the pneumatic tire 1 according to the present embodiment, a lateral groove 16B, at least a portion of which is included in the shoulder region AS, is provided in the land portion 14B located on the outermost side in the tire width direction from among the land portions 14A, 14B partitioned by the circumferential grooves 12A, 12B. In the ground contact region G of the tread portion 10, preferably, either one of an inner side terminating edge 16Bi or an outer side terminating edge 16Bo in the tire width direction of the lateral groove 16B terminates within the land portion 14B.

In the present embodiment, the inner side terminating edge 16Bi terminates within the land portion 14B, in other words, the inner side terminating edge 16Bi is not connected to the circumferential groove 12B. When the lateral groove 16B is formed in this way, radiation from the lateral grooves of the air column resonance due to the main grooves is reduced, so the vehicle external noise can be further reduced. However, both the inner side terminating edge 16Bi and the outer side terminating edge 16Bo of the lateral groove 16B may not terminate within the land portion 14B.

EXAMPLES

In these Working Examples, tire performance tests for fuel efficiency index, tire noise performance, and steering stability were carried on pneumatic tires under different conditions.

In these performance tests, each test tire was assembled onto a rim with a compatible size as described above, and was filled to an internal pressure of 230 kPa.

The following is a description of the test methods for the performance tests carried out on the test tires.

(Fuel Efficiency Index)

The test tires were fitted to a compact front-wheel drive vehicle of engine displacement 1800 cc, and driven for 50 laps at a speed of 100 km/h on a test course of total length 2 km. The fuel economy improvement rate was measured relative to the fuel consumption rate of a Conventional Example as an index of 100. Larger index values indicate better the fuel economy.

(Steering Stability)

The test tires were assembled onto a standard rim and fitted to a passenger car (engine displacement 1800 cc), and the feeling when changing lanes when driven for three laps on a test course of 2 km per lap was evaluated by three specialist drivers. The evaluation results for the average value of the evaluation points for each test tire was expressed as an index, with the average value of the feeling evaluation points of Comparative Example 1 as 100. Larger index values indicate superior steering stability.

(Tire Noise Performance)

In accordance with the method prescribed by JASO C-606, the test tires were fitted to a passenger vehicle (engine displacement 1800 cc), then driven at a speed of 60 km/h on a dry road surface, and the noise level (dB) was measured at a position 7.5 m from the traveling lane. The evaluation results were expressed as the difference from a standard value, with the measurement value of a Conventional Example as the reference value. In other words, if the evaluation result of the test tire was a negative (−) value, the noise level of the test tire was lower than the reference value, and therefore the tire noise performance of the test tire was superior.

(Water Drainage Performance)

The test tires were fitted to a passenger vehicle (engine displacement 1800 cc), and a straight line hydroplaning test was carried out, and the velocity at which hydroplaning occurred was measured and evaluated. In this straight line hydroplaning test, the test vehicle was driven into a pool of water depth 10 mm while increasing the velocity, and the slip ratio of the pneumatic tire was measured. The velocity at which the slip ratio was 10% was taken to be the velocity at which hydroplaning occurs. In this test, the measurement results for tests other than the Conventional Example were expressed as an index with the measurement results of the Conventional Example as 100. With this Working Example, the greater the value of the index the better the hydroplaning performance, and therefore the better the water drainage performance.

The following is a description of each of the test tires and the performance test results.

Conventional Example

Figure 3:
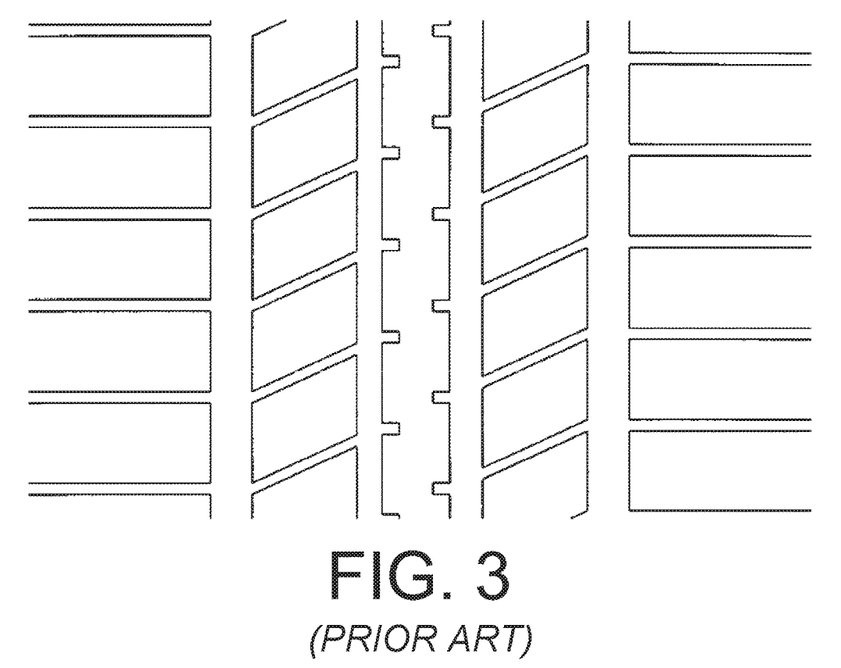
FIG. 3 is a plan development view illustrating a portion of the tread portion of the pneumatic tire according to a conventional example.

The pneumatic tire according to the Conventional Example was a tire of size 205/55R16, the value of "SW/OD" was 0.32, in other words, equation <1> was not satisfied. The tread portion of the pneumatic tire according to the Conventional Example was provided with the tread pattern illustrated in FIG. 3.

Working Examples 1 to 14

The pneumatic tires according to Working Examples 1 to 14 had tire sizes that were different from each other, and "SW/OD" took values within the range from 0.3 to 0.21, in other words, equation <1> was satisfied. On the tread portion 10 of the pneumatic tires according to Working Examples 1 to 14, tread patterns were provided based on the tread pattern illustrated in FIG. 3, modified to conform to each tire size.

Performance tests for the fuel efficiency index were carried out for the pneumatic tires according to the Conventional Example and Working Examples 1 to 14. Table 3 shows the dimensions for each test tire and the performance test results.

TABLE 3

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Nominal width | 205 | 185 | 195 | 175 | 185 | 195 | 155 | 165 |
| Aspect ratio | 55 | 55 | 50 | 60 | 50 | 45 | 60 | 55 |
| Inner diameter (inch) | 16 | 17 | 18 | 17 | 19 | 21 | 17 | 18 |
| OD (mm) | 632 | 641 | 657 | 648 | 673 | 713 | 624 | 644 |
| SW/OD | 0.32 | 0.30 | 0.30 | 0.28 | 0.28 | 0.28 | 0.26 | 0.26 |
| Fuel efficiency index (—) | 100 | 100.1 | 100.1 | 100.2 | 100.2 | 100.2 | 100.3 | 100.3 |

|  | Working Example 8 | Working Example 9 | Working Example 10 | Working Example 11 | Working Example 12 | Working Example 13 | Working Example 14 |
|---|---|---|---|---|---|---|---|
| Nominal width | 175 | 145 | 155 | 165 | 145 | 155 | 145 |
| Aspect ratio | 50 | 65 | 60 | 55 | 70 | 60 | 55 |
| Inner diameter (inch) | 20 | 17 | 19 | 20 | 17 | 20 | 21 |

TABLE 3-continued

| OD (mm) | 688 | 627 | 675 | 695 | 642 | 700 | 698 |
|---|---|---|---|---|---|---|---|
| SW/OD | 0.26 | 0.24 | 0.24 | 0.24 | 0.23 | 0.23 | 0.21 |
| Fuel efficiency index (—) | 100.3 | 100.4 | 100.4 | 100.4 | 100.4 | 100.4 | 100.4 |

According to the performance test results of Table 3, the test tires according to Working Examples 1 to 14, which satisfied equation <1>, had superior fuel efficiency index compared with the Conventional Example. From these performance test results, it has been confirmed that of the tire sizes tested, the fuel consumption of tire size 165/55R20 (Working Example 11) was sufficiently improved relative to that of tire size 205/55R16. Therefore, in the following tests for tread pattern, this tire size was used.

Working Examples 15 to 17 and Comparative Examples 1 to 3

Working Examples 15 to 17 and Comparative Examples 1 to 3 had a tire size of 165/55R20, and were test tires with the groove area ratio GR spread within the range from 8 to 27%. Here, Working Examples 15 to 17 satisfied the relationships of all of equations <1> to <4>, but Comparative Examples 1 to 3 did not satisfy the relationship of equation <2>.

Figure 4:
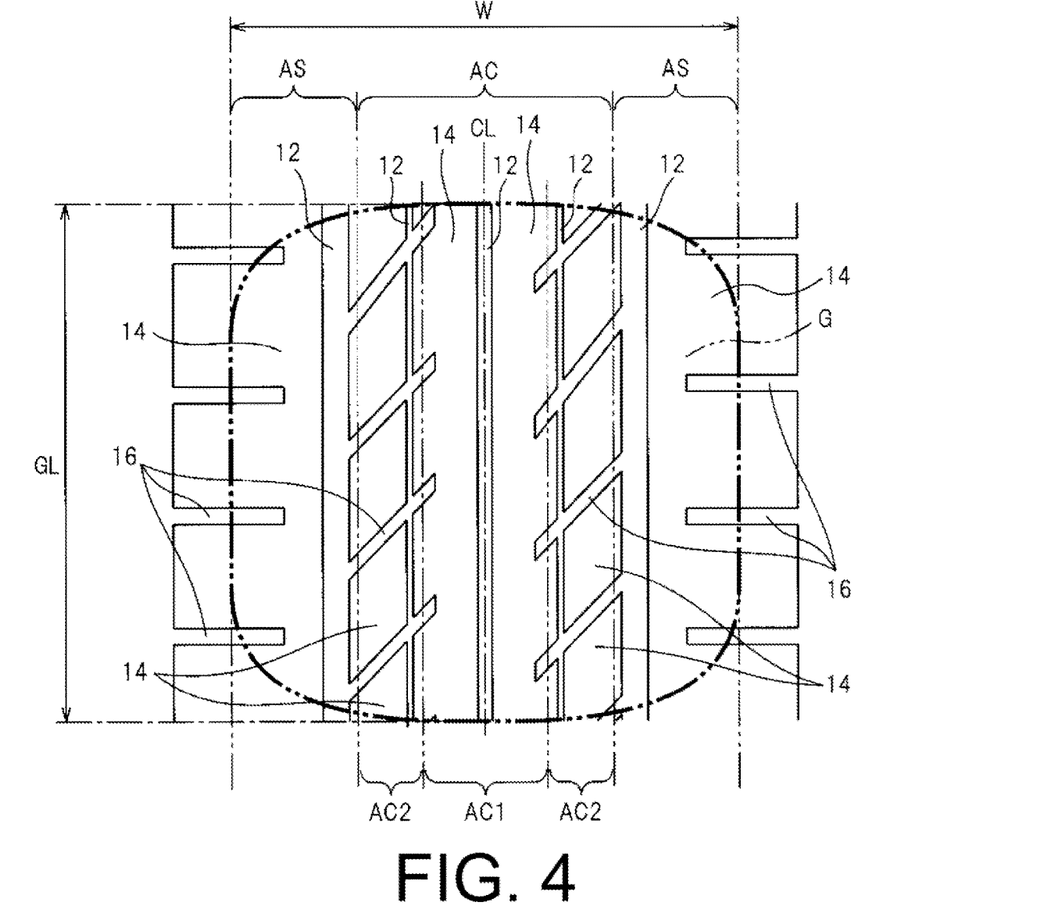
FIG. 4 is a plan development view illustrating a portion of the tread portion of the pneumatic tire according to another embodiment of the present technology.

The tread pattern illustrated in FIG. 2 was provided on the tread portion of the pneumatic tire according to Working Example 15. On the tread portion of the other tires according to the Working Examples (16 to 27) and the Comparative Examples (1 to 4), a tread pattern was provided using the tread pattern of FIG. 2 as basis, that was modified to conform to the groove area ratio GR and other dimensional parameters set for each test tire. Here as one example, FIG. 4 illustrates the tread pattern provided in the tread portion of the pneumatic tire according to Working Example 17. In the pneumatic tires according to Working Examples 16 to 27 and Comparative Examples 1 to 4, as the tread pattern illustrated in FIG. 4, using the tread pattern of FIG. 2 as the basis, the groove areas of the circumferential grooves 12 and the lateral grooves 16, the number and position in the tire width direction of the circumferential grooves 12, and the like were varied to comply with each of the dimensional parameters of each of the test tires.

Working Examples 18 to 21, Comparative Example 4

The pneumatic tires according to Working Examples 18 to 21 and Comparative Example 4 were test tires with a tire size of 165/55R20, and "GSR/GCR" spread within the range from 0.8 to 2.2. As stated above, the tread portion of the pneumatic tires according to Working Examples 18 to 21 and Comparative Example 4 were provided with a tread pattern that was varied using FIG. 2 as basis. Here, Working Examples 18 to 21 satisfied the relationships of equations <1> to <3>. In addition, Working Examples 18 to 20 satisfied the relationship of equation <4>, but Working Example 21 did not satisfy the relationship of equation <4>.

Performance tests for fuel efficiency index, tire noise performance, steering stability, and water drainage performance were carried out on the pneumatic tires according to the Conventional Example, Working Examples 15 to 21, and Comparative Examples 1 to 4. Table 4 shows the dimensions for each test tire and the performance test results.

TABLE 4

|  | Conventional Example | Comparative Example 1 | Comparative Example 2 | Working Example 15 | Working Example 16 | Working Example 17 |
|---|---|---|---|---|---|---|
| Nominal width | 205 | 165 | 165 | 165 | 165 | 165 |
| Aspect ratio | 55 | 55 | 55 | 55 | 55 | 55 |
| Inner diameter (inch) | 16 | 20 | 20 | 20 | 20 | 20 |
| OD (mm) | 632 | 695 | 695 | 695 | 695 | 695 |
| SW/OD | 0.32 | 0.24 | 0.24 | 0.24 | 0.24 | 0.24 |
| GR (%) | 30 | 30 | 8 | 12 | 17 | 22 |
| GSR/GCR | 1.0 | 1.0 | 1.5 | 1.5 | 1.5 | 1.5 |
| Fuel efficiency index (—) | 100 | 100.5 | 100.4 | 100.4 | 100.5 | 100.5 |
| Tire noise performance (dB) | Reference value | +0.5 | −1.0 | −0.7 | −0.5 | −0.2 |
| Steering stability (—) | 106 | 100 | 105 | 104 | 103 | 102 |
| Water drainage performance (—) | 100 | 107 | 85 | 99 | 102 | 105 |

|  | Comparative Example 3 | Comparative Example 4 | Working Example 18 | Working Example 19 | Working Example 20 | Working Example 21 |
|---|---|---|---|---|---|---|
| Nominal width | 165 | 165 | 165 | 165 | 165 | 165 |
| Aspect ratio | 55 | 55 | 55 | 55 | 55 | 55 |
| Inner diameter (inch) | 20 | 20 | 20 | 20 | 20 | 20 |
| OD (mm) | 695 | 695 | 695 | 695 | 695 | 695 |
| SW/OD | 0.24 | 0.24 | 0.24 | 0.24 | 0.24 | 0.24 |
| GR (%) | 27 | 18 | 18 | 18 | 18 | 18 |

TABLE 4-continued

| | | | | | | |
|---|---|---|---|---|---|---|
| GSR/GCR | 1.5 | 0.8 | 1.1 | 1.4 | 1.8 | 2.2 |
| Fuel efficiency index (—) | 100.5 | 100.4 | 100.4 | 100.5 | 100.5 | 100.5 |
| Tire noise performance (dB) | +0.2 | +0.2 | −0.1 | −0.4 | −0.6 | −0.6 |
| Steering stability (—) | 101 | 103 | 103 | 103 | 101 | 99 |
| Water drainage performance (—) | 106 | 104 | 103 | 103 | 101 | 99 |

According to the performance test results of Table 4, the test tires according to Working Examples 15 to 21, which satisfied the relationships of equations <1> to <3>, had fuel efficiency index superior to that of the Conventional Example, and tire noise performance superior to that of the Conventional Example. In other words, these test tires can reduce vehicle external noise, while at the same time reducing rolling resistance. Note that although the test tire according to Comparative Example 2 had superior fuel efficiency index and tire noise performance relative to the Conventional Example, the water drainage performance was greatly inferior to that of the Conventional Example. This is because the number of grooves arranged on the tread portion of the test tire according to Comparative Example 2, which did not satisfy the relationship of equation <2>, was small. In contrast, the test tires according to Working Examples 15 to 17 had water drainage performance that was virtually the same as that of the Conventional Example or superior to that of the Conventional Example, which is desirable.

In addition, according to the performance test results of Table 4, the test tires according to Working Examples 15 to 20, which satisfied the relationship of equations <1> to <4>, were superior to the Conventional Example in the fuel efficiency index, and were superior to the Conventional Example in both the tire noise performance and the steering stability performance. Note that Working Example 21 was inferior to the Conventional Example in steering stability performance. It is considered that this result is due to the fact that there were many grooves provided in the shoulder region AS of the tread portion of the pneumatic tire according to Working Example 21.

Working Examples 22 to 25

The pneumatic tires according to Working Examples 22 to 25 had a tire size of 165/55R20. As described above, on the tread portion of the pneumatic tire according to Working Examples 22 to 25, a tread pattern was provided that was varied using FIG. 2 as basis. Here, Working Examples 23 to 25 further satisfied the relationship of equation <5>, but Working Example 22 did not satisfy the relationship of equation <5>. Also, the groove area ratio GCR1 of Working Examples 22 to 24 was equal to or less than 20%, but the groove area ratio GCR1 of Working Example 25 was equal to or greater than 20%.

Performance tests for fuel efficiency index and tire noise performance were carried out on the pneumatic tires according to the Conventional Example and Working Examples 22 to 25. Table 5 shows the numerical values of the dimensions of each test tire, the test conditions, and the performance test results. Note that in the following Table 5 and Table 6, in the item "GCR1, GCR2 comparison", "GCR1>" indicates that the groove area ratio GCR1 is greater than the groove area ratio GCR2, and "GCR2>" indicates that the groove area ratio GCR2 is greater than the groove area ratio GCR1. In other words, it means that test tires indicated as "GCR2>" satisfied equation <5>.

TABLE 5

| | Conventional Example | Working Example 22 | Working Example 23 | Working Example 24 | Working Example 25 |
|---|---|---|---|---|---|
| Nominal width | 205 | 165 | 165 | 165 | 165 |
| Aspect ratio | 55 | 55 | 55 | 55 | 55 |
| Inner diameter (inch) | 16 | 20 | 20 | 20 | 20 |
| OD (mm) | 632 | 695 | 695 | 695 | 695 |
| SW/OD | 0.32 | 0.24 | 0.24 | 0.24 | 0.24 |
| GR (%) | 30 | 18 | 18 | 18 | 18 |
| GSR/GCR | 1.0 | 1.5 | 1.5 | 1.5 | 1.5 |
| GCR1, GCR2 comparison | GCRl> | GCR1> | GCR2> | GCR2> | GCR2> |
| GCR1 (%) | 40 | 18 | 12 | 18 | 25 |
| Fuel efficiency index (—) | 100 | 100.5 | 100.5 | 100.5 | 100.5 |
| Tire noise performance (dB) | Reference value | −0.3 | −0.6 | −0.6 | −0.4 |

According to the performance test results of Table 5, the pneumatic tires according to Working Example 23 and Working Example 24, which satisfied the relationship of equation <5> and had a groove area ratio GCR1 of 20% or less, were superior to Working Example 22 and Working Example 25 in tire noise performance. In other words, the vehicle external noise was further reduced.

Working Example 26, Working Example 27

The pneumatic tires according to Working Example 26 and Working Example 27 had a tire size of 165/55R20. As described above, the tread portion of the pneumatic tires according to Working Example 26 and Working Example 27 were provided with a tread pattern that was varied using FIG. 2 as basis. Here, Working Example 26 further satisfied the relationship of equation <6>, but Working Example 27 did not satisfy the relationship of equation <6>.

Performance tests for fuel efficiency index and tire noise performance were carried out on the pneumatic tires according to the Conventional Example, Working Example 26, and Working Example 27. Table 6 shows the numerical values of the dimensions of each test tire, the test conditions, and the performance test results.

TABLE 6

|  | Conventional Example | Working Example 26 | Working Example 27 |
|---|---|---|---|
| Nominal width | 205 | 165 | 165 |
| Aspect ratio | 55 | 55 | 55 |
| Inner diameter (inch) | 16 | 20 | 20 |
| OD (mm) | 632 | 695 | 695 |
| SW/OD | 0.32 | 0.24 | 0.24 |
| GR (%) | 30 | 18 | 18 |
| GSR/GCR | 1.0 | 1.5 | 1.5 |
| GCR1, GCR2 comparison | GCR1> | GCR2> | GCR2> |
| GCR1 (%) | 40 | 18 | 18 |
| A/GCR | 0.6 | 0.6 | 1.2 |
| Fuel efficiency index (—) | 100 | 100.5 | 100.5 |
| Tire noise performance (dB) | Reference value | −0.6 | −0.4 |

According to the performance test results of Table 6, Working Example 26, which satisfied the relationship of the equation <6>, had superior tire noise performance than that of Working Example 27, which did not satisfy the relationship of equation <6>. In other words, the vehicle external noise was further reduced.

From the entire test results of Tables 3 to 6 above, it has been confirmed that the pneumatic tire according to the present technology can reduce the rolling resistance while at the same time reducing vehicle external noise.

The present technology is defined as follows.

(1) A pneumatic tire including grooves on the tread portion, the ratio of a total width SW and an outer diameter OD of the pneumatic tire SW/OD satisfying:

$SW/OD \leq 0.3$ and in a ground contact region of the tread portion, when a groove area ratio with respect to a ground contact area is GR, a ground contact width is W, a region having a width of 50% of the ground contact width W and a tire equatorial line as center is a center region AC, a groove area ratio in the center region AC is GCR, a ground contact region on an outer side in a tire width direction from the center region AC is a shoulder region AS, and a groove area ratio in the shoulder region AS is GSR, the ground contact region of the tread portion being formed to satisfy:

$10\% \leq GR \leq 25\%$ $GCR \leq GSR$.

(2) The pneumatic tire according to (1), wherein the relationship of GCR and GSR satisfies:

$1.0 \leq GSR/GCR \leq 2.0$.

(3) The pneumatic tire according to (1) or (2), wherein when a region having a width corresponding to 25% of the ground contact width W with the tire equatorial line as center is a region AC1, a groove area ratio in the region AC1 is GCR1, a region within the center region AC on the outer side in the width direction of the region AC1 is a region AC2, and a groove area ratio in the region AC2 is GCR2, $GCR1 < GCR2$ is satisfied.

(4) The pneumatic tire according to (3), wherein the groove area ratio GCR1 is 20% or less.

(5) The pneumatic tire according to any one of (1) to (4), wherein at least one circumferential groove extending in the tire circumferential direction is provided in the tread portion, and when a groove area ratio of the circumferential grooves in the center region AC is A, the ratio thereof with respect to the groove area ratio GCR satisfies:

$0 \leq A/GCR \leq 1.0$.

(6) The pneumatic tire according to any one of (1) to (5), wherein lateral grooves, at least a portion of which is included in the shoulder region AS, are provided in the land portions located on the outermost side in the tire width direction from among the land portions partitioned by the circumferential grooves, and any one of an inner side terminating edge and an outer side terminating edge of the lateral grooves terminates within the land portion.

The pneumatic tire according to the present technology can be beneficially used as a pneumatic tire for improved fuel economy for passenger vehicles.

What is claimed is:

1. A pneumatic tire comprising grooves on a tread portion, a ratio SW/OD of a total width SW and an outer diameter OD of the pneumatic tire satisfying:

$SW/OD \leq 0.3$, and in a ground contact region of the tread portion, a groove area ratio with respect to a ground contact area is GR, a ground contact width is W, a region having a width of 50% of the ground contact width W and a tire equatorial line as center is a center region AC, a groove area ratio in the center region AC is GCR, a ground contact region on an outer side in a tire width direction from the center region AC is a shoulder region AS, and a groove area ratio in the shoulder region AS is GSR, the ground contact region of the tread portion is formed to satisfy:

$21\% \leq GR \leq 25\%$, and $GCR \leq GSR$; wherein a region having a width corresponding to 25% of the ground contact width W with the tire equatorial line as center is a region AC1, a groove area ratio in the region AC1 is GCR1, a region within the center region AC on the outer side in the width direction of the region AC1 is a region AC2, a groove area ratio in the region AC2 is GCR2, and GCR1<GCR2 is satisfied;

the grooves include at least one circumferential groove extending in a tire circumferential direction; and a single circumferential groove is in the region AC1.

2. The pneumatic tire according to claim 1, wherein the relationship of GCR and GSR satisfies:

$1.0 \leq GSR/GCR \leq 2.0$.

3. The pneumatic tire according to claim 2, wherein a region having a width corresponding to 25% of the ground contact width W with the tire equatorial line as center is a region AC1, a groove area ratio in the region AC1 is GCR1, and the groove area ratio GCR1 is 20% or less.

4. The pneumatic tire according to claim 2, wherein a groove area ratio of the single circumferential groove in the center region AC is A, and the ratio thereof with respect to the groove area ratio GCR satisfies: $0 \leq A/GCR \leq 1.0$.

5. The pneumatic tire according to claim 2, wherein lateral grooves, at least a portion of which is included in the shoulder region AS, are provided in land portions located on an outermost side in the tire which direction from among land portions partitioned by circumferential grooves, and any one of an inner side terminating edge and an outer side terminating edge of the lateral grooves terminates within the land portion.

6. The pneumatic tire according to claim 1, wherein the groove area ratio GCR1 is 20% or less.

7. The pneumatic tire according to claim 1, wherein a region having a width corresponding to 25% of the ground contact width W with the tire equatorial line as center is a region AC1, a groove area ratio in the region AC1 is GCR1, and the groove area ratio GCR1 is 20% or less.

8. The pneumatic tire according to claim 1, wherein when a groove area ratio of the single circumferential groove in the center region AC is A, the ratio thereof with respect to the groove area ratio GCR satisfies:

$$0 \leq A/GCR \leq 1.0.$$

9. The pneumatic tire according to claim 1, wherein lateral grooves, at least a portion of which is included in the shoulder region AS, are provided in land portions located on an outermost side in the tire width direction from among land portions partitioned by circumferential grooves, and
   any one of an inner side terminating edge and an outer side terminating edge of the lateral grooves terminates within the land portion.

10. The pneumatic tire according to claim 1, wherein the single circumferential groove in the region AC1 is a single circumferential main groove.

11. The pneumatic tire according to claim 1, wherein the at least one circumferential groove includes two circumferential narrow grooves in the center region.

* * * * *